United States Patent [19]

Nakano et al.

[11] Patent Number: 5,182,768
[45] Date of Patent: Jan. 26, 1993

[54] DIGITAL TELEPHONE SET CAPABLE OF BEING SIMULTANEOUSLY USED BY A PLURALITY OF PERSONS BY USING ONE TRANSMISSION LINE

[75] Inventors: Yuji Nakano; Fumikazu Hamatani, both of Kawasaki, Japan

[73] Assignee: Nitsuko Corporation, Kawasaki, Japan

[21] Appl. No.: 780,018

[22] Filed: Oct. 21, 1991

[51] Int. Cl.⁵ .................... H04M 1/02; H04M 1/72; H04M 9/02; H04M 13/00
[52] U.S. Cl. .................... 379/387; 379/428; 379/165; 379/187
[58] Field of Search ............ 379/187, 93, 165, 177, 379/419, 428, 434, 433, 436, 387; 370/110.1; 375/7, 8, 36

[56] References Cited

U.S. PATENT DOCUMENTS 4,107,477 8/1978 Morrison ..................... 379/428
5,014,302 5/1991 Kappeler et al. ............. 379/165

Primary Examiner—Stafford D. Schreyer
Attorney, Agent, or Firm—Frishauf, Holtz, Goodman & Woodward

[57] ABSTRACT

In a digital telephone set connected to a digital data exchange through a transmission line, a plurality of handsets, which are mounted on a telephone body, are for converting input sounds into input analog speech signals and for converting output analog speech signals into output sounds. Connected to the handsets, a plurality of analog-to-digital converters converts the input analog speech signals into input digital speech signals. Connected to the handsets, a plurality of digital-to-analog converters converts output digital speech signals into the output analog speech signals. On the telephone body are mounted a set of dialling keys for producing a numerical signal. Connected to the dialling keys, a control device is for producing input control data in response to the numerical signal and is for producing an output control signal in response to output control data. Connected to the transmission line, the control device, the analog-to-digital converters, and the digital-to-analog converters, a multiplexing/demultiplexing circuit is for transmitting/receiving transmission/reception time division multiplexed signals to/from the digital data exchange through the transmission line. The multiplexing/demultiplexing circuit is for multiplexing the input digital speech signals and the input control data into the transmission time division multiplexed signal and for demultiplexing the reception time division multiplexed signal into the output digital speech signals and the output control data.

3 Claims, 3 Drawing Sheets

DIGITAL TELEPHONE SET CAPABLE OF BEING SIMULTANEOUSLY USED BY A PLURALITY OF PERSONS BY USING ONE TRANSMISSION LINE

BACKGROUND OF THE INVENTION

1. Field of the Invention

This invention relates to a digital telephone set which is connected to a digital data exchange through a transmission line.

2. Description of the Prior Art

As well known in the art, the digital telephone set is connected to a digital data exchange through a transmission line. In general, the digital data exchange is able to transmit/receive, through the transmission line, a time division multiplexed signal into which a plurality of digital speech signals are multiplexed in a time division fashion. Such a digital data exchange is, for example, a central office in an Integrated Services Digital Network (ISDN) system according to Recommendation Q.911 of CCITT (International Telegraph and Telephone Consultive Committee). The digital data exchange may be a digital Private Branch Exchange (PBX).

A conventional digital telephone set comprises only one handset which is mounted on a telephone body. The handset is connected to the telephone body through a handset cord. Accordingly, the conventional digital telephone set is used by only one person at a time by using one transmission line.

SUMMARY OF THE INVENTION

It is therefore an object of the present invention to provide a digital telephone set which is capable of being simultaneously used by a plurality of persons by using one transmission line.

Other objects of this invention will become clear as the description proceeds.

On describing the gist of an aspect of this invention, it is possible to understand that a digital telephone set is connected to a digital data exchange through a transmission line. The digital data exchange is able to transmit, through the transmission line, a time division multiplexed signal into which a plurality of digital speech signals are multiplexed in a time division fashion.

According to the above-mentioned aspect of this invention, the above-understood digital telephone set comprises a telephone body. Mounted on the telephone body, a plurality of handsets are for converting input sounds into input analog speech signals and for converting output analog speech signals into output sounds. The telephone body contains a plurality of analog-to-digital converters which are connected to the handsets. The analog-to-digital converters converts the input analog speech signals into input digital speech signals. The telephone body contains a plurality of digital-to-analog converters which are connected to the handsets. The digital-to-analog converters converts output digital speech signals into the output analog speech signals. Mounted on the telephone body, a set of dialing keys are for producing a numerical signal. The telephone body contains a control device which is connected to the set of dialing keys. The control device is for producing input control data in response to the numerical signal and for producing an output control signal in response to output control data. The telephone body contains a multiplexing/demultiplexing circuit which is connected to the transmission line, the control device, the analog-to-digital converters, and the digital-to-analog converters. The multiplexing/demultiplexing circuit is for transmitting/receiving transmission/reception time division multiplexed signals to/from the digital data exchange through the transmission line. The multiplexing/demultiplexing circuit is for multiplexing the input digital speech signals and the input control data into the transmission time division multiplexed signal and for demultiplexing the reception time division multiplexed signal into the output digital speech signals and the output control data.

DESCRIPTION OF A PREFERRED EMBODIMENT

Figure 1:
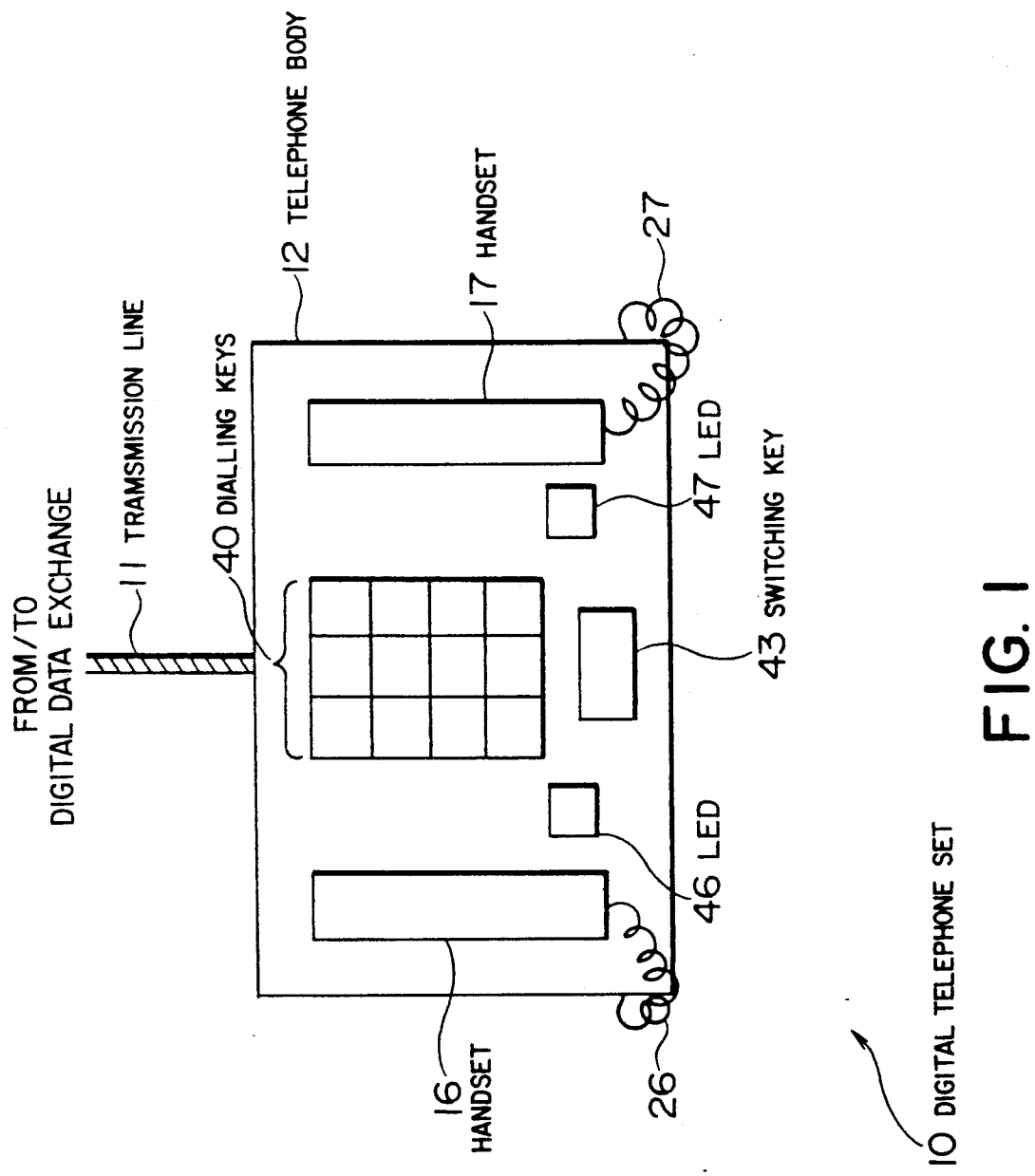
FIG. 1 is a plan view of a digital telephone set according to an embodiment of the present invention.
Figure 2:
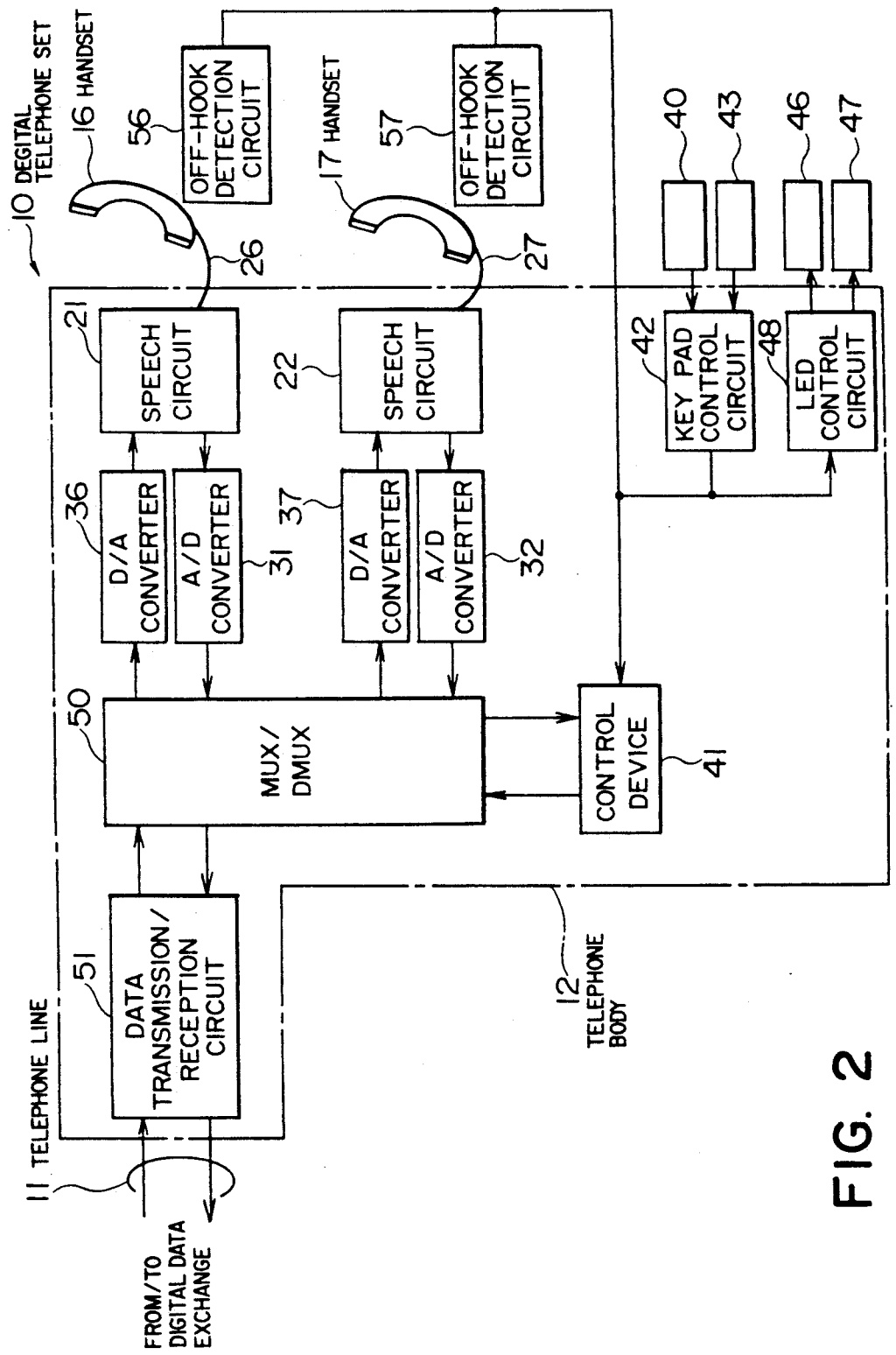
FIG. 2 is a block diagram view of the digital telephone set illustrated in FIG. 1.

Referring to FIGS. 1 and 2, a digital telephone set 10 according to a preferred embodiment of the present invention is connected to a digital data exchange through a transmission line 11. In the example being illustrated, the transmission line 11 consists of paired two wires as shown in FIG. 2. The digital data exchange is able to transmit/receive, through the transmission line 11, a time division multiplexed signal into which a plurality of digital speech signals are multiplexed in a time division fashion. Such a digital data exchange is, for example, a central office in an ISDN system according to Recommendation Q.911 of CCITT. The digital data exchange may be a digital PBX.

The illustrated digital telephone set 10 comprises a telephone body 12. On the telephone body 12 is mounted first and second handsets 16 and 17. The first handset 16 converts a first input sound into a first input analog speech signal and converts a first output analog speech signal into a first output sound. Likewise, the second handset 17 converts a second input sound into a second input analog speech signal and converts a second output analog speech signal into a second output sound. The first and the second handsets and 17 are connected to first and second speech circuits 21 and 22, which the telephone body 12 contains, through first and second handset cords 26 and 27, respectively.

The first and the second speech circuits 21 and 22 are connected to first and second analog-to-digital (A/D) converters 31 and 32, respectively, which the telephone body 12 contains. In other words, the first and the second analog-to-digital converters 31 and 32 are connected to the first and the second handsets 16 and 17 through the first and the second speech circuits 21 and 22 and the first and the second handset cords 26 and 27, respectively. The first analog-to-digital converter 31 is supplied with the first input analog speech signal from the first handset 16 through the first speech circuit 21 and the first handset cord 26. The first analog-to-digital converter 31 converts the first input analog speech signal into a first input digital speech signal. Similarly, the second analog-to-digital converter 32 is supplied with the second input analog speech signal from the second handset 17 through the second speech circuit 22 and the second handset cord 27. The second analog-to-digital converter 32 converts the second input analog speech signal into a second input digital speech signal.

In addition, the first and the second speech circuits 21 and 22 are connected to first and second digital-to-analog (D/A) converters 36 and 37, respectively, which the telephone body 12 contains. That is, the first and the second digital-to-analog (D/A) converters 36 and 37 are connected to the first and the second handsets 16 and 17 through the first and the second speech circuits 21 and 22 and the first and the second handset cords 26 and 27, respectively. In the manner which will later be described, the first digital-to-analog converter 36 is supplied with a first output digital speech signal. The first digital-to-analog converter 36 converts the first output digital speech signal into the first output analog speech signal. The first output analog speech signal is supplied to the first handset 16 through the first speech circuit 21 and the first handset cord 26. Likewise, the second digital-to-analog converter 37 is supplied with a second output digital speech signal in the manner which will later be described. The second digital-to-analog converter 37 converts the second output digital speech signal into the second output analog speech signal. The second output analog speech signal is supplied to the second handset 17 through the second speech circuit 22 and the second handset cord 27.

On the telephone body 12 is mounted a set of dialling keys 40 for producing a numerical signal. The telephone body 12 contains a control device 41 which is connected to the set of dialling keys 40 through a key pad control circuit 42. On the telephone body 12 is further mounted a switching key 43. The switching key 43 is connected to the control device 41 through the key pad control circuit 42. The switching key 43 serves as a designating arrangement for designating one of the first and the second handsets 16 and 17 to supply a designated signal to the control device 41 through the key pad control circuit 42. Responsive to one of the numerical signal and the designated signal at a time, the control device 41 is for producing input control data.

On the telephone body 12 is mounted first and second indicator lamps 46 and 47 each of which is a light emission diode (LED). The first and the second indicator lamps 46 and 47 are connected to the control device 41 through an LED control circuit 48. In the manner which will later be described, the control device 41 is also for producing an output control signal in response to output control data. Responsive to the output control signal, the first indicator lamp 46 indicates an enable condition of the first handset 16. Likewise, the second indicator lamp 47 indicates an enable condition of the second handset 17 in response to the output control signal.

The telephone body 12 furthermore contains a multiplexing/demultiplexing circuit (MUX/DMUX) 50 which is connected to the control device 41, the first and the second analog-to-digital converters 31 and 32, and the first and the second digital-to-analog converters 36 and 37. The multiplexing/demultiplexing circuit 50 is also connected to the transmission line 11 through a data transmission/reception circuit 51. The multiplexing/demultiplexing circuit 50 is for transmitting/receiving transmission/reception time division multiplexed signals to/from the digital data exchange through the transmission line 11 and the data transmission/reception circuit 51. The multiplexing/demultiplexing circuit 50 is for multiplexing the first and the second input digital speech signals and the input control data into the transmission time division multiplexed signal. The multiplexing/demultiplexing circuit 50 is also for demultiplexing the reception time division multiplexed signal into the first and the second output digital speech signals and the output control data.

The digital telephone set 10 has first and second hook switches (not shown) for use in the first and the second handsets 16 and 17, respectively. The first and the second hook switches are connected to first and second off-hook detection circuits 56 and 57 for detecting off-conditions of the first and the second hook switches, respectively. On detecting of the off-condition of the first hook switch, the first off-hook detection circuit 56 produces a first off-hook detection signal. Similarly, on detecting of the off-condition of the second hook switch, the second off-hook detection circuit 57 produces a second off-hook detection signal. The first and the second off-hook detection signals are supplied to the control device 41.

Figure 3A:
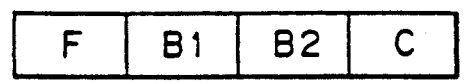
FIGS. 3(a) and (b) show signal frame formats of transmission/reception time division multiplexed signals on a transmission line for use in the digital telephone set illustrated in FIG. 1.
Figure 3B:
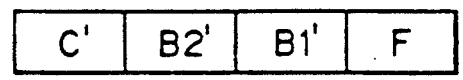

Referring to FIGS. 3(a) and (b), description will proceed to the transmission/reception time division multiplexed signals. The transmission time division multiplexed signal comprises a synchronization field F for a synchronization signal, a first input data field B1 for the first input digital speech signal, a second input data field B2 for the second input digital speech signal, and an input control data field C for the input control data, as shown in FIG. 3(a). Likewise, the reception time division multiplexed signal comprises the synchronization field F for the synchronization signal, a first output data field B1' for the first output digital speech signal, a second output data field B2' for the second output digital speech signal, and an output control data field C' for the output control data, as shown in FIG. 3(b).

Operation of the digital telephone set will be described with reference to FIGS. 1 to 3. At first, a transmission operation of the digital telephone set will be described. A reception operation of the digital telephone set will be described later in the following.

In the transmission operation, the first handset 16 converts the first input sound into the first input analog speech signal. Likewise, the second handset 17 converts the second input sound into the second input analog speech signal. The first input analog speech signal is delivered to the first analog-to-digital converter 31 through the first handset cord 26 and the first speech circuit 21. The second input analog speech signal is delivered to the second analog-to-digital converter 32 through the second handset cord 27 and the second speech circuit 21. The first analog-to-digital converter 31 converts the first input analog speech signal into the first input digital speech signal. Similarly, the second analog-to-digital converter 32 converts the second input analog speech signal into the second input digital speech signal. The first and the second input digital speech signals are supplied to the multiplexing/demultiplexing circuit 50.

The multiplexing/demultiplexing circuit 50 is also supplied with the input control data from the control device 41. The multiplexing/demultiplexing circuit 50 multiplexes the first and the second digital speech signals and the input control data into the transmission time division multiplexed signal as shown in FIG. 3(a). More specifically, the transmission time division multiplexed signal comprises the synchronization field F including the synchronization signal, the first input data field B1 including the first input digital speech signal, the second input data field B2 including the second input digital speech signal, and the input control data field C including the input control data. The transmission time division multiplexed signal is transmitted to the digital data exchange through the data transmission/reception circuit 51 and the transmission line 11.

In the reception operation, the digital telephone set 10 receives, from the digital data exchange through the transmission line 11, the reception time division multiplexed signal as shown in FIG. 3(b). The reception time division multiplexed signal is delivered to the multiplexing/demultiplexing circuit 50 through the data transmission/reception circuit 51. More particularly, the reception time division multiplexed signal comprises the synchronization field F including the synchronization signal, the first output data field B1' including the first output digital speech signal, the second output data field B2' including the second output digital speech signal, and the output control data field C' including the output control data. The multiplexing/demultiplexing circuit 50 demultiplexes the reception time division multiplexed signal into the first and the second output digital speech signals and the output control data. The multiplexing/demultiplexing circuit 50 supplies the first and the second output digital speech signals to the first and the second digital-to-analog converters 36 and 37. The multiplexing/demultiplexing circuit 50 supplies the control device 41 with the output control data.

The first digital-to-analog converter 36 converts the first output digital speech signal into the first output analog speech signal. Likewise, the second digital-to-analog converter 37 converts the second output digital speech signal into the second output analog speech signal. The first output analog speech signal is sent to the first handset 16 through the first speech circuit 21 and the first handset cord 26. The second output analog speech signal is sent to the second handset 17 through the second speech circuit 22 and the second handset cord 27. The first handset 16 converts the first output analog speech signal into the first output sound. Similarly, the second handset 17 converts the second output analog speech signal into the second output sound. Responsive to the output control data, the control device 41 produces the output control signal. The output control signal is delivered to the first and the second indicator lamps 46 and 47 through the LED control circuit 48.

While this invention has thus far been described only in conjunction with a preferred embodiment thereof, it will be readily possible for those skilled in the art to put this invention into practice in various other manners. For example, the digital telephone set may comprise a plurality of handsets which are in number not less than three. In this event, the digital telephone set may comprise a plurality of analog-to-digital converters, a plurality of digital-to-analog converters, and a plurality of indicator lamps.

What is claimed is:

1. A digital telephone set connected to a digital data exchange through a transmission line, said digital data exchange being able to transmit/receive, through said transmission line, a time division multiplexed signal into which a plurality of digital speech signals are multiplexed in a time division fashion, said digital telephone set comprising:

a telephone body;

a plurality of handsets mounted on said telephone body for converting input sounds into input analog speech signals and for converting output analog speech signals into output sounds;

a plurality of analog-to-digital converters connected to said handsets for converting said input analog speech signals into input digital speech signals;

a plurality of digital-to-analog converters connected to said handsets for converting output digital speech signals into said output analog speech signals;

a set of dialling keys mounted on said telephone body for producing a numerical signal;

a control device connected to said dialling keys for producing input control data in response to said numerical signal and for producing an output control signal in response to output control data; and a multiplexing/demultiplexing circuit connected to said transmission line, said control device, said analog-to-digital converters, and said digital-to-analog converters for transmitting/receiving transmission/reception time division multiplexed signals to/from said digital data exchange through said transmission line, said multiplexing/demultiplexing circuit being for multiplexing said input digital speech signals and said input control data into said transmission time division multiplexed signal and for demultiplexing. said reception time division multiplexed signal into said output digital speech signals and said output control data.

2. A digital telephone set as claimed in claim 1, further comprising designating means mounted on said telephone body and connected to said control device for designating one of said handsets to supply a designated signal to said control device.

3. A digital telephone set as claimed in claim 1, further comprising a plurality of indicator lamps mounted on said telephone body and connected to said control device for indicating an enable condition of said handsets in response to said output control signal.

* * * * *